United States Patent
Yang (10) Patent No.: US 7,412,467 B2
(45) Date of Patent: Aug. 12, 2008

(54) SYSTEM AND METHOD FOR OPERATION MODE CONTROL IN A COMPUTER SYSTEM

(75) Inventor: Li-Yen Yang, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 1043 days.

(21) Appl. No.: 10/858,215

(22) Filed: Jun. 1, 2004

(65) Prior Publication Data

US 2005/0005201 A1    Jan. 6, 2005

(30) Foreign Application Priority Data

Jun. 17, 2003    (TW) .............................. 92116348 A (51) Int. Cl.
*G06F 9/00*    (2006.01)
(52) U.S. Cl. .................................... 708/105
(58) Field of Classification Search ................ 708/105
See application file for complete search history.

(56) References Cited

U.S. PATENT DOCUMENTS

| | | | |
|---|---|---|---|
| 4,080,659 A * | 3/1978 | Francini ..................... 708/134 |
| 4,527,917 A * | 7/1985 | Ueno ........................... 400/70 |
| 5,285,399 A * | 2/1994 | Nishiguchi et al. .......... 708/142 |
| 6,924,790 B1 * | 8/2005 | Bi ............................... 345/179 |
| 2003/0094354 A1 * | 5/2003 | Badarneh ..................... 200/18 |

* cited by examiner

*Primary Examiner*—D. H. Malzahn (57) ABSTRACT

A system and method is provided for operation mode control. The system includes a mode controller generating a combination of electric potentials and an additional microprocessor having a storage module having a mode list, a detection module and a control module. The detection module detects the combination of the electric potentials and determines a shift direction of the mode controller according thereto. The control module selects a target operation mode adjacent to the current operation mode in the mode list according to the shift direction, and checks the disparity of the current operation mode and the target operation mode to generate a control signal to direct the computer system to reboot or execute an application specific to the second operation mode, and subsequently enables the computer system to operate in the second operation mode.

18 Claims, 6 Drawing Sheets

SYSTEM AND METHOD FOR OPERATION MODE CONTROL IN A COMPUTER SYSTEM

BACKGROUND OF THE INVENTION

1. Field of the Invention

The present invention relates to a system and method for operation mode control, and particularly to a system and method of operating a computer system in different operation modes using a mode controller and an additional microprocessor.

2. Description of the Related Art

In addition to conventional computer functions, most current computer systems have integrated a great number of multimedia functions, such as CD/MP3 player, VCD/DVD player, TV, and image processing utility.

Current computer systems can satisfy the demands of users for the purpose of entertainment. The operating system of a computer can execute numerous multimedia software, such as music player, video player, TV player, radio (AM/FM), image capturer and explorer, and video/audio recording programs, and perform associated multimedia functions using related peripheral appliances and corresponding drivers.

In general, conventional configurations of a computer system provide a fixed number of specific control means corresponding to available operation modes. The computer system can execute related software and operates in the designated operation mode by activating corresponding control means. Conventional methods are simple, however, the number of the control means available for use in a computer system is limited and must be preset, such that extension of the maneuverability of the computer system is limited. To extend the maneuverability of the computer system and enable the user to operate the computer in various operation modes in order to fulfill a specific demand for multimedia interaction, the manufacturer of the computer system must produce related hardware to support the operation modes, thereby increasing the cost.

SUMMARY OF THE INVENTION

It is therefore an object of the present invention to provide a system and method of operating computer system in different operation modes using a mode controller and an additional microprocessor.

To achieve the above object, the present invention provides a system and method for operation mode control. The system according to the present invention includes a mode controller for generating a combination of electric potentials on two connection terminals, and an additional microprocessor. The additional microprocessor includes a storage module including a mode list recording a plurality of operation modes, and a pointer for designating one of the operation modes in the mode list as a first operation mode for the computer system. The additional microprocessor also includes a detection module to detect the combination of the electric potentials at a first sampling point, and determines a shift direction of the mode controller according thereto. The additional microprocessor further includes a control module to select a second operation mode adjacent to the first operation mode in the mode list according to the shift direction, check the disparity between the first and the second operation modes, provide a control signal to the computer system according to the check result, direct the computer system to reboot or execute an application specific to the second operation mode, and subsequently enable the computer system to operate in the second operation mode.

The method for operation mode control according to the present invention uses an additional microprocessor to detect a combination of the electric potentials triggered by a mode controller at a first sampling point, and then determines a shift direction of the mode controller according thereto. Then, a second operation mode adjacent to the first operation mode in the mode list is selected according to the shift direction. Then, the additional microprocessor checks the disparity between the first and the second operation modes, provides a control signal to the computer system according to the check result, and directs the computer system to reboot or execute an application specific to the second operation mode, and subsequently enables the computer system to operate in the second operation mode.

Further, the detection module stops detecting the combination of the electric potentials within a first predetermined period after the first sampling point, and resumes to detect the combination of the electric potentials at a second sampling point after the first predetermined period is passed and before a second predetermined period is reached. If the combination of the electric potentials derived at the first sampling point and the combination of the electric potentials derived at the second sampling point are different with each other, the detection module ignores the shift direction corresponding to the combination of electric potentials derived at the second sampling point.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
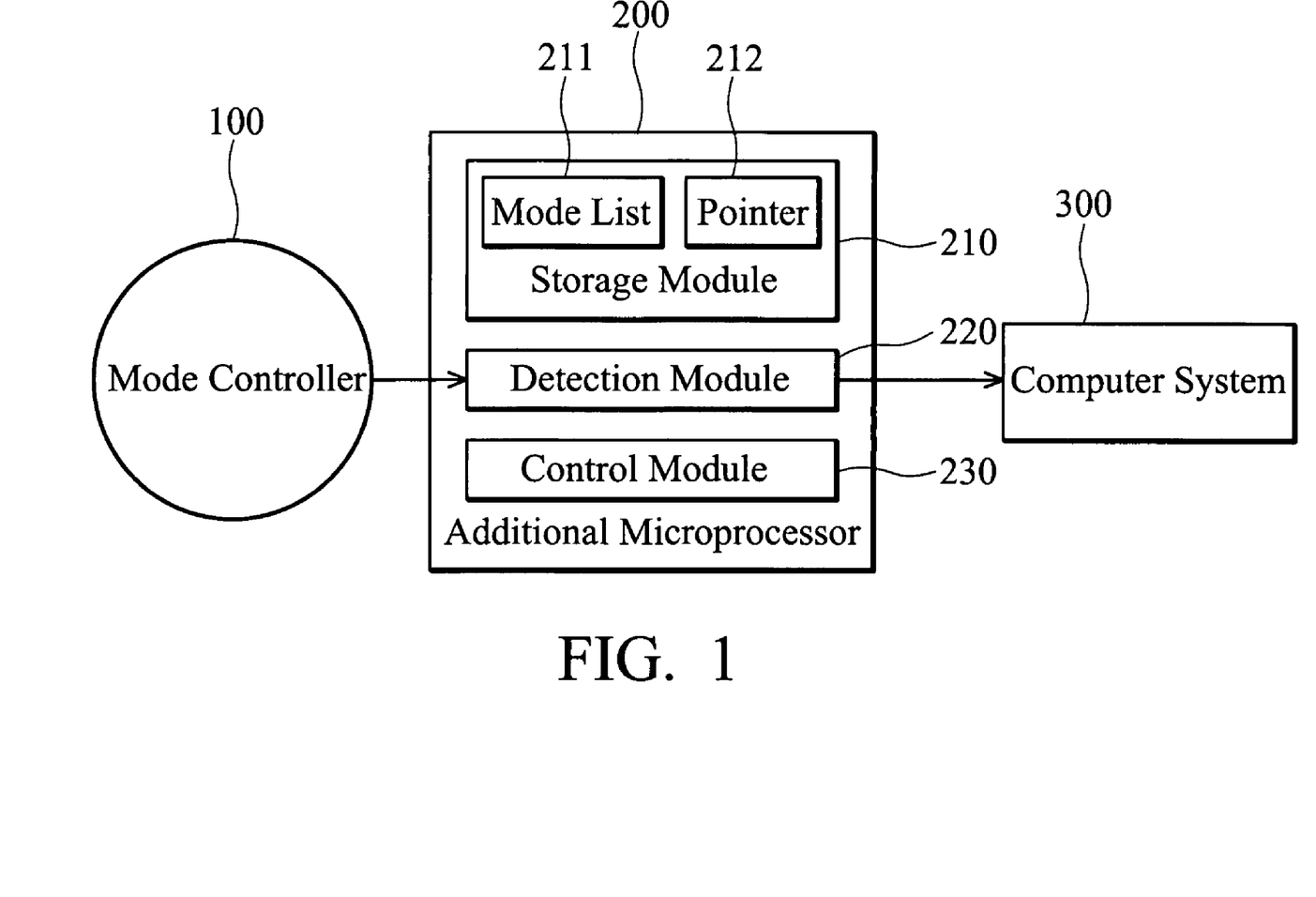
FIG. 1 is a schematic diagram illustrating the architecture of the system for operation mode control according to the present invention.

FIG. 1 illustrates the architecture of the system for operation mode control according to the present invention. The system for operation mode control according to the present invention can be applied in a computer system 300. The system includes a mode controller 100 and an additional microprocessor 200.

The mode controller 100 determines the operation mode of the computer system 300. In the preferred embodiment, the mode controller 100 can be a knob controller constructed on the computer host. With the rotation of the mode controller 100, the computer system 300 may operate in a normal operation mode or one of the sub-modes subjected to a multimedia mode class, such as a music playing mode, a video playing mode, a TV broadcasting mode, a radio receiving mode, and an image exploring mode.

Figure 2:
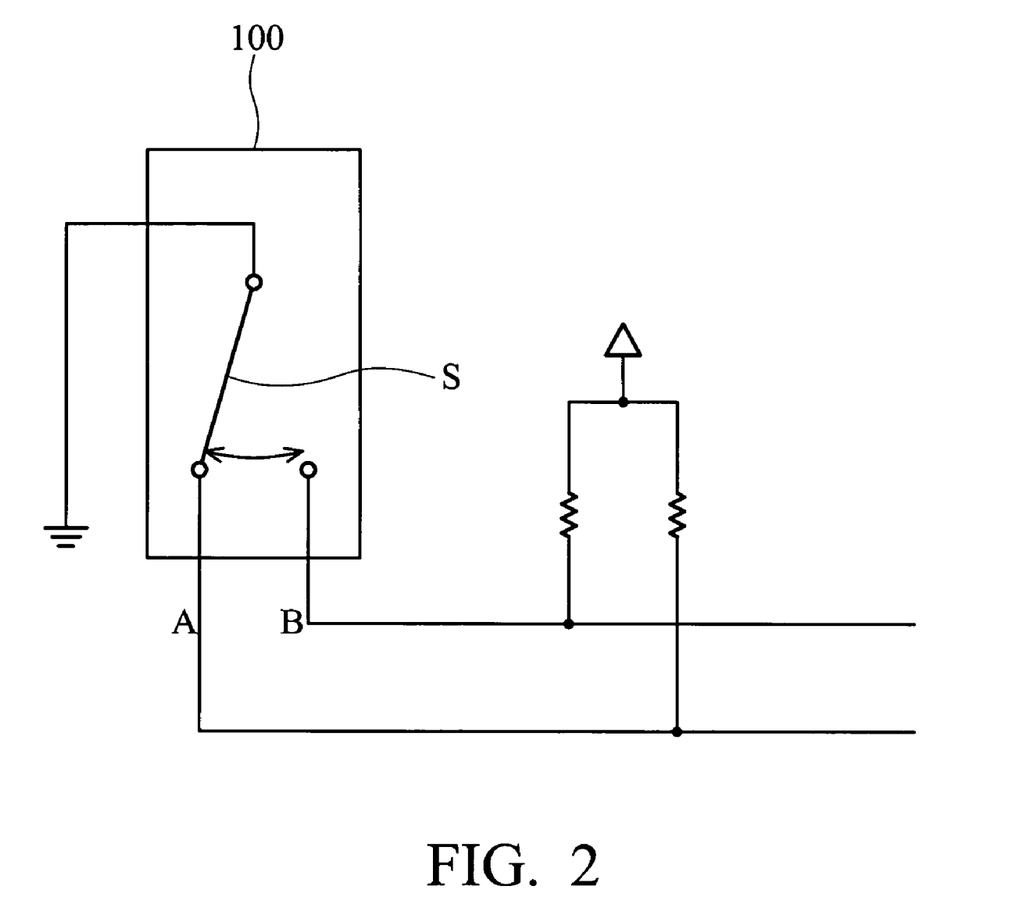
FIG. 2 is a schematic diagram illustrating the circuit of the mode controller.
Figure 3A:
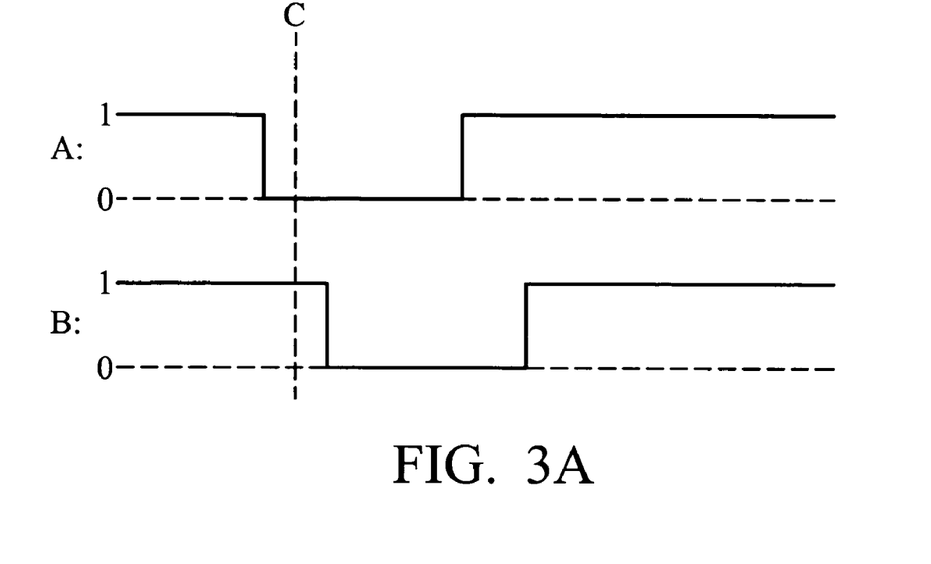
FIG. 3A is a schematic diagram illustrating the electric potentials of the mode controller that is applied with clockwise rotation.
Figure 3B:
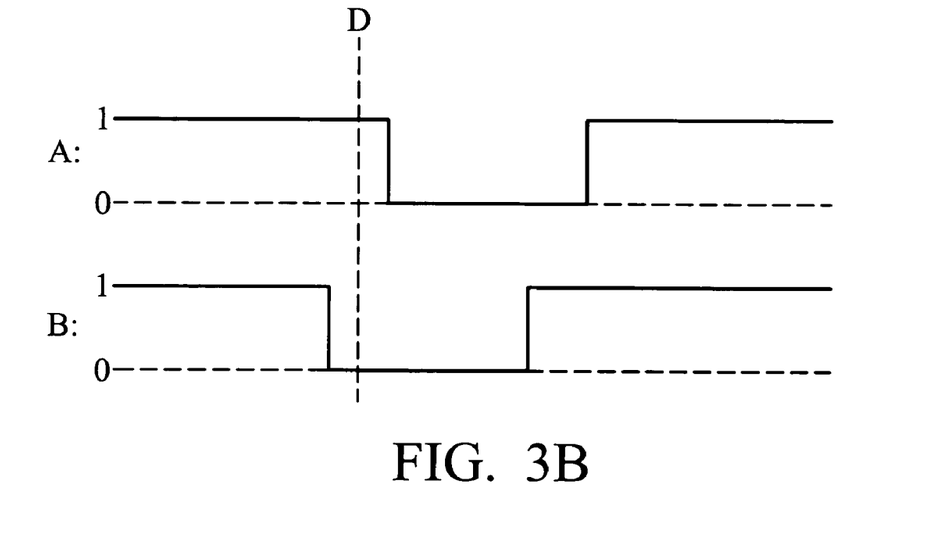
FIG. 3B is a schematic diagram illustrating the electric potential of the mode controller that is applied with counter-clockwise rotation.

The principle of the mode controller 100 is illustrated in FIG. 2. When the switch S rotates, a first connection terminal A and a second connection terminal B can be triggered to raise its corresponding electric potential. For example, if the mode controller 100 rotates clockwise, the second connection terminal B and the first connection terminal A are triggered successively by the switch S, and the combination of the electric potentials on the two connection terminals is illustrated in FIG. 3A, in which C represents a sampling point for detection. In addition, if the mode controller 100 executes counterclockwise rotation, the first connection terminal A and the second connection terminal B are triggered successively by the switch S, and the combination of the electric potentials on the two connection terminals is illustrated in FIG. 3B, in which D represents a sampling point for detection.

The additional microprocessor includes a storage module 210, a detection module 220 and a control module 230. The storage module 210 includes a mode list 211 and a pointer (flag) 212, in which the mode list 211 records the available operation modes provided by the computer system 300, and the pointer 212 selects one of the available operation modes and designate the selected operation mode as a first operation mode representing the current operation mode of the computer system 300. Note that in order to add a new operation mode, the manufacturer may add the desired operation modes to the mode list 211 without the requirement of additional hardware support.

Figure 4:
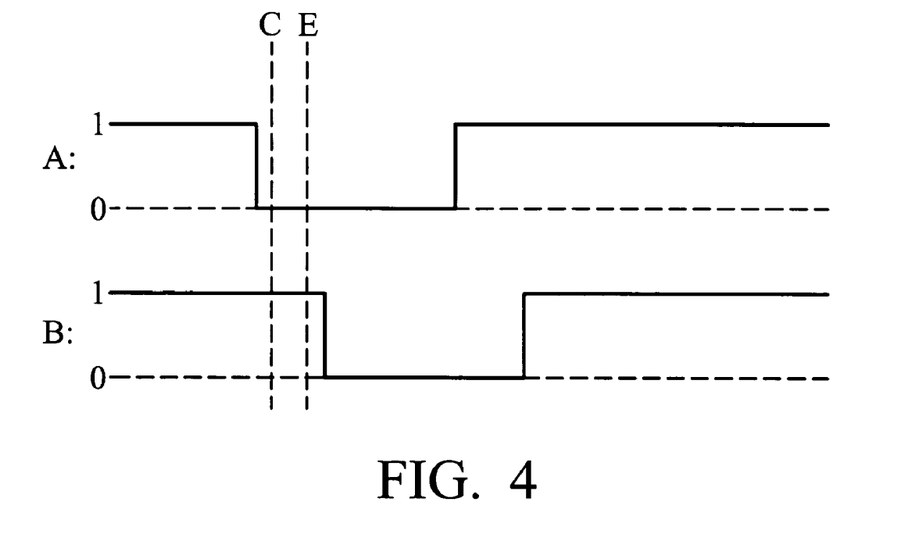
FIG. 4 is a schematic diagram illustrating detection of the combination of the electric potentials triggered by the mode controller.

The detection module 220 detects the state of the mode controller 100, that is, the detection module 220 detects the combination of the electric potentials on the first connection terminal A and the second connection terminal B, and determines a shift direction of the mode controller 100 according thereto. It should be noted that, in general, two successive sampling points are used for accurate detection, such as sampling points C and E in FIG. 4, and the detection is valid if the detection results derived at the two sampling points match with each other.

Figure 5:
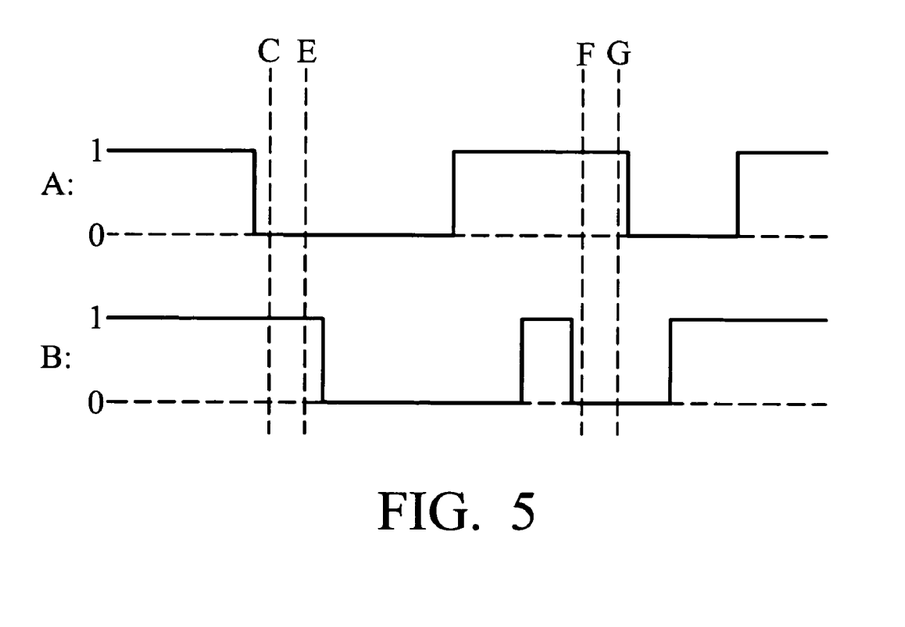
FIG. 5 is a schematic diagram illustrating the electric potentials caused by the rotation counterforce of the mode controller.

In addition, the rotation counterforce applied to the mode controller 100 may likely to cause electric potentials on the two connection terminals A and B of the mode controller 1010, as illustrated in FIG. 5. In this case, the determination of the shift direction of the mode controller 100 may be wrong if the detection is performed at sampling points F and G. Therefore, the present invention provides two modes to solve the problem. In the first mode, the detection module 220 may ignore all triggers of the connection terminals, that is, detection module 220 stops detecting the combination of the electric potentials within a first predetermined period, such as 200 ms, after the first detection. In the second mode, the detection module 220 may ignore the detection of a succeeding sampling point if the shift direction corresponding to the detection is not the same as that of a succeeding sampling point within a second predetermined period after the first detection. It should be noted that the two modes could be executed in combination or independently.

Figure 6:
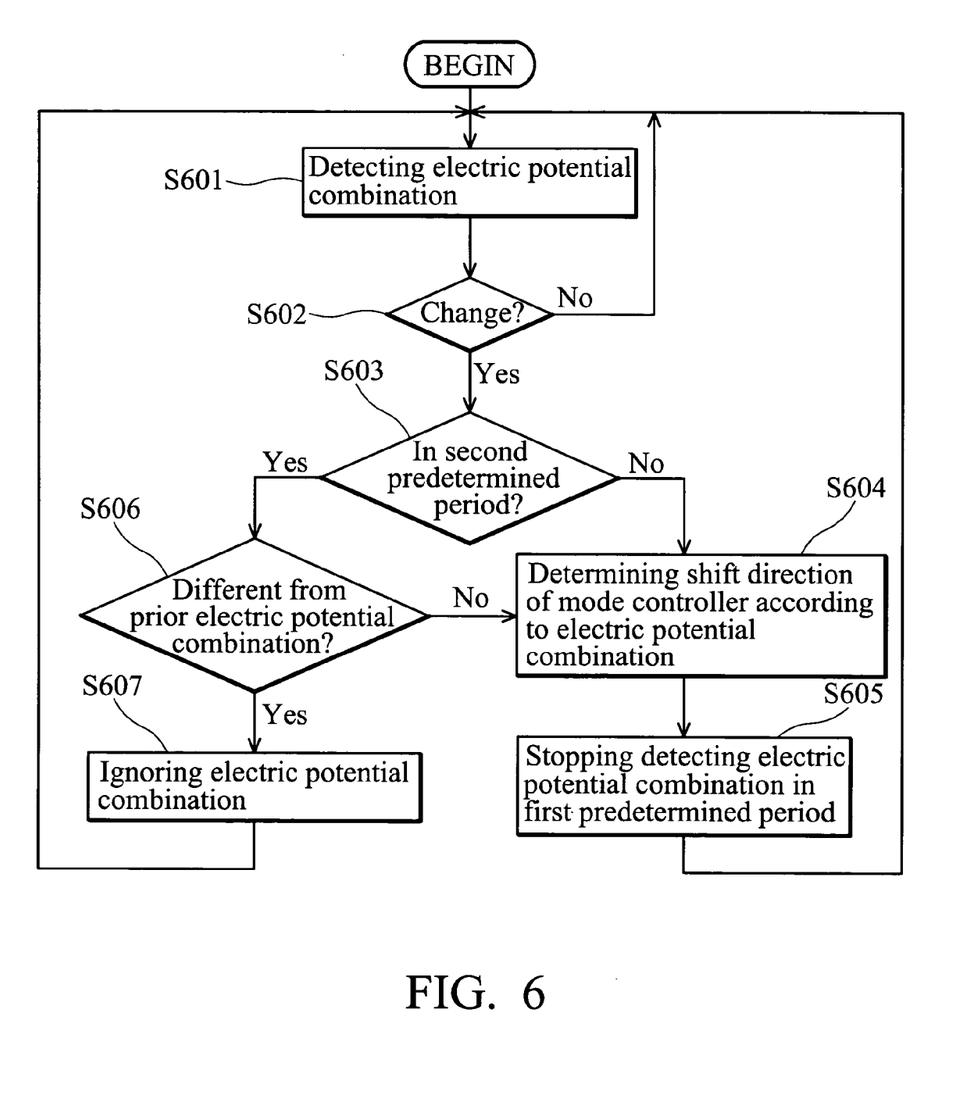
FIG. 6 is a flowchart showing the processing of the detection module according to the present invention.

FIG. 6 shows the processing of the detection module 220 according to the present invention. First, in step S601, the detection module 220 detects the combination of the electric potentials on the first connection terminal A and the second connection terminal B. If the combination of the electric potentials on the connection terminals A and B does not change and the electric potentials of two connection terminals both stay low (No in step S602), the flow returns to step S601. If the combination of the electric potentials of the connection terminals A and B changes (Yes in step S602), in step S603, it determines whether the detection is occurred within the second predetermined period after a first detection. If not (No in step S603), in step S604, the detection module 220 determines a shift direction of the mode controller 100 according thereto, and in step S605, stops detecting the combination of the electric potentials within the first predetermined period. After the first predetermined period passes, the flow returns to step S601.

If the detection is occurred within the second predetermined period after a first detection (Yes in step S603), in step S606, the detection module 220 checks whether the combination of the electric potential is different from the prior one. If not (No in step S606), in step S604, the detection module 220 determines a shift direction of the mode controller according thereto, and performs the process of step S605. If so (Yes in step S606), in step S607, the detection module 220 ignores the combination of the electric potentials of this detection, and the flow returns to step S601.

The control module 230 selects a second operation mode adjacent to the first operation mode targeted by the pointer 212 in the mode list 211 according to the control direction determined by the detection module 220. The operation mode following the first operation mode in the mode list 211 is selected if the shift direction of the mode controller 100 is clockwise, and the operation mode preceding the first operation mode in the mode list 211 is selected if the shift direction of the mode controller 100 is counterclockwise. The control module 230 also checks the disparity between the first and second operation modes to provide a control signal to the computer system 300 according to the check result, thereby directing the computer system 300 to reboot or execute an application specific to the second operation mode, and subsequently enables the computer system to operate in the second operation mode.

If the first operation mode is a normal operation mode and the second operation mode is one of the sub-modes of the multimedia mode class, the control module 230 generates the control signal to a power circuit (not shown in figures) of the computer system 300, thereby directing the computer system 300 to reboot and operating in the second operation mode, and executing the application specific to the second operation mode. If the first operation mode is one of the sub-modes of the multimedia mode class and the second operation mode is the normal operation mode, the control module 230 generates the control signal to the power circuit of the computer system 300, thereby directing the computer system 300 to reboot and operate in the normal operation mode. If the first and second operation modes are different sub-modes of the multimedia mode class, the control module 230 generates the control signal to the computer system 300, thereby directing the computer system 300 to operate in the second operation mode, and execute the application specific to the second operation mode. It should be noted that the number of applications may be coincident to the number of the sub-modes of the multimedia mode class, and each sub-mode executes a specific application under a purified operating environment.

In addition, a display screen (not shown) can be provided on the computer system 300 to show the current operation mode of the computer system 300. If the mode controller 100 rotates, the control module 230 may send a signal to display the related information of the second operation mode, such as the name of the operation mode. Further, the operation modes can be selected in order using the mode controller 100. It should be noted that the content shown on the display screen is allowed to change in a preset period, such as 2 seconds, and the additional microprocessor will direct the computer system to change operation mode until the mode controller stops.

Figure 7:
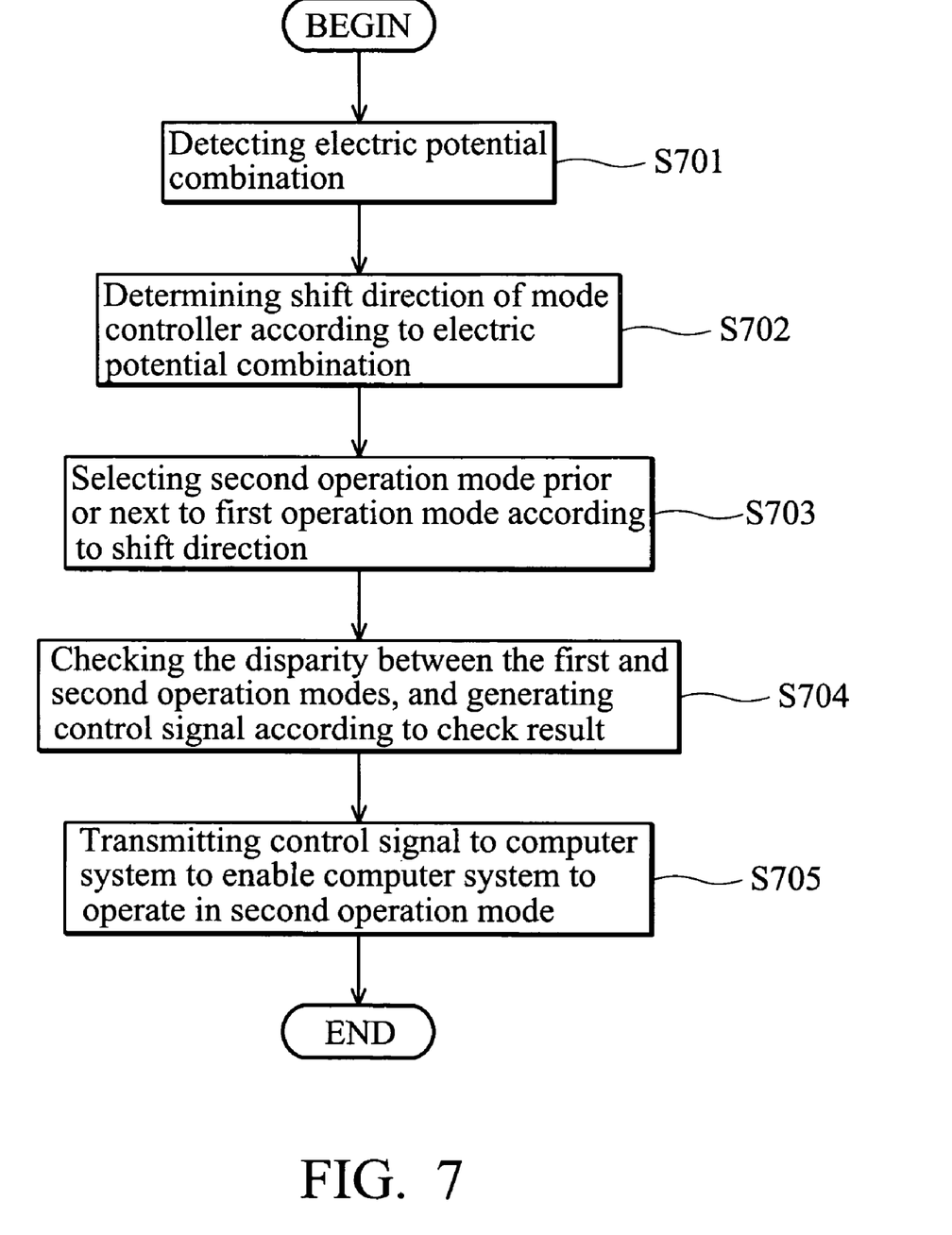
FIG. 7 is a flowchart showing the method for operation mode control according to the present invention.

FIG. 7 shows the method for operation mode control according to the present invention.

First, in step S701, the detection module 220 of the additional microprocessor 200 detects the combination of the electric potentials, and in step S702, determines a shift direction of the mode controller according thereto. Then, in step S703, the control module 230 of the additional microprocessor 200 selects a second operation mode adjacent to the first operation mode in the mode list 211 according to the shift direction. Thereafter, in step S704, the control module 230 checks the disparity between the first and second operation modes and generates a control signal according to the check result. Afterward, in step S705, the control module 230 transmits the control signal to the computer system 300 to direct the computer system 300 to reboot or execute an application specific to the second operation mode, and subsequently operate in the second operation mode.

As a result, the system and method for operation mode control in a computer system according to the present invention easily enables the mode controller to control the computer system operation in various operation modes via the additional microprocessor. In addition, to extend available operation modes, the manufacturer can incorporate the desired operation modes into the mode list without requirement of additional hardware support, thereby saving related costs.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for operation mode control for use in a computer system, comprising:
   a mode controller for generating a combination of electric potentials on a first connection terminal and a second connection terminal; and
   an additional microprocessor, comprising:
      a storage module, further comprising:
         a mode list recording a plurality of operation modes; and
         a pointer designating one of operation modes in the mode list as a first operation mode;
      a detection module for detecting the combination of the electric potentials at a first sampling point, and determine a shift direction of the mode controller according thereto; and
      a control module for selecting a second operation mode adjacent to the first operation mode in the mode list according to the shift direction, checking a disparity between the first and the second operation modes, generate a control signal to the computer system according to the check result, directing the computer system to reboot or execute an application specific to the second operation mode, and subsequently enabling the computer system to operate in the second operation mode.

2. The system for operation mode control as claimed in claim 1 wherein the control module further updates the pointer to designate the second operation mode according to the shift direction.

3. The system for operation mode control as claimed in claim 1 wherein the detection module further stops detecting the combination of the electric potentials within a first predetermined period after the first sampling point.

4. The system for operation mode control as claimed in claim 1 wherein the detection module further detects the combination of the electric potentials at a second sampling point within a second predetermined period after the first sampling point, and ignores the combination of electric potentials detected at the second sampling point if the electric potential combination derived at the first sampling point and the electric potential combination derived at the second sampling point are different.

5. The system for operation mode control as claimed in claim 1, further comprising a display screen, to which the control module further sends a signal to display information of the second operation mode.

6. The system for operation mode control as claimed in claim 1 wherein the computer system is configured to operate in a normal operating mode or one of the sub-modes subjected to a multimedia mode class.

7. The system for operation mode control as claimed in claim 6 wherein, when the first operation mode is the normal operation mode and the second operation mode is one of the sub-modes of the multimedia mode class, the control module generates a control signal to a power circuit of the computer system to direct the computer system to reboot, enables the computer system to operate in the second operation mode, and executes the application specific to the second operation mode.

8. The system for operation mode control as claimed in claim 6 wherein, when the first operation mode is one of the sub-modes of the multimedia mode class and the second operation mode is the normal operation mode, the control module generates a control signal to a power circuit of the computer system to direct the computer system to reboot and operate in the normal operation mode.

9. The system for operation mode control as claimed in claim 6 wherein, when the first and second operation modes are different sub-modes of the multimedia mode class, the control module generates a control signal to the computer system to direct the computer system to operate in the second operation mode, and execute the application specific to the second operation mode.

10. A method for operation mode control for use in a computer system, comprising the steps of:
   providing a mode controller to generate a combination of electric potentials on a first connection terminal and a second connection terminal;
   providing an additional microprocessor comprising a mode list recording a plurality of operation modes and a pointer selecting one of the operation modes in the mode list as a first operation mode;
   detecting the combination of the electric potentials at a first sampling point, and determining a shift direction of mode controller according thereto;
   selecting a second operation mode adjacent to the first operation mode in the mode list according to the shift direction;
   checking the disparity between the first and the second operation modes; and
   generating a control signal to the computer system according to the check result, and directing the computer system to reboot or execute an application corresponding to the second operation mode, and subsequently enabling the computer system to operate in the second operation mode.

11. The method for operation mode control as claimed in claim 10 further comprising updating the pointer to designate the second operation mode according to the shift direction.

12. The method for operation mode control as claimed in claim 10 further comprising stopping detecting the combination of the electric potentials within a first predetermined period after the first sampling point.

13. The method for operation mode control as claimed in claim 10 further comprising detecting the electric potential combination at a second sampling point after the first sampling point in a second predetermined period, and ignoring the electric potential combination detected at the second sampling point if the electric potential combination of the first sampling point and the electric potential combination of the second sampling point are different.

14. The method for operation mode control as claimed in claim 10 further comprising sending a signal to a display screen to display information of the second operation mode.

15. The method for operation mode control as claimed in claim 10 wherein the computer system is configured to operate in a normal operation mode or and one of sub-modes subjected to a multimedia mode class.

16. The method for operation mode control as claimed in claim 15 wherein, when the first operation mode is the normal operation mode and the second operation mode is one of the sub-modes of the multimedia mode class, the additional microprocessor generates a control signal to a power circuit of the computer system to direct the computer system to reboot, operate in the second operation mode, and execute the application corresponding to the second operation mode.

17. The method for operation mode control as claimed in claim 15 wherein, when the first operation mode is one of the sub-modes of the multimedia mode class and the second operation mode is the normal operation mode, the additional microprocessor generates a control signal to a power circuit of the computer system to direct the computer system to reboot and operate in the normal operation mode.

18. The method for operation mode control as claimed in claim 15 wherein, when the first and second operation modes are different sub-modes of the multimedia mode class, the additional microprocessor generates a control signal to the computer system to direct the computer system to operate in the second operation mode, and executes an application specific to the second operation mode.

* * * * *